United States Patent [19]
Shorr

[11] Patent Number: 5,137,942
[45] Date of Patent: Aug. 11, 1992

[54] METHOD OF MIXING HIGH TEMPERATURE COMPOSITE FILLED, THERMOPLASTIC ENGINEERING RESINS

[75] Inventor: Norman Shorr, Pittsburgh, Pa.

[73] Assignee: Ralph B. Andy, Washington, Pa. ; a part interest

[21] Appl. No.: 607,037

[22] Filed: Oct. 31, 1990

Related U.S. Application Data

[63] Continuation-in-part of Ser. No. 462,901, Oct. 23, 1989, Pat. No. 4,980,390.

[51] Int. Cl.$^5$ .......................... C08K 3/34; C08L 77/00
[52] U.S. Cl. ..................................... 523/307; 524/413; 524/449; 524/451; 524/456; 524/491; 524/497; 524/514
[58] Field of Search ................ 523/307; 524/451, 456, 524/491, 492, 413, 449, 514

[56] References Cited

U.S. PATENT DOCUMENTS

| | | | |
|---|---|---|---|
| 4,885,329 | 12/1989 | Tominaga et al. | 524/451 |
| 4,891,397 | 1/1990 | Liu | 524/451 |
| 4,945,005 | 7/1990 | Aleckner, Jr. et al. | 524/451 |
| 4,985,486 | 1/1991 | Westeppe et al. | 524/456 |

*Primary Examiner*—Herbert J. Lilling
*Attorney, Agent, or Firm*—William J. Ruano

[57] ABSTRACT

The method of compounding a high strength, cost-effective, composite of a high temperature, water sensitive, polar, polyamide-inide resin mixed with a talc, water absorbent/adsorbent filler. The method comprises raising said mixture to a temperature of about; 500° F. to develop plasticity in said engineering resin. Thereafter there is added a lower temperature softening, water repellant, polypropylene resin and a compatibilizing additive. Finally all components are mixed in a mixing chamber sufficiently to obtain complete dispersion and homogeneity of the composite.

2 Claims, No Drawings

METHOD OF MIXING HIGH TEMPERATURE COMPOSITE FILLED, THERMOPLASTIC ENGINEERING RESINS

This is a continuation-in-part of application Ser. No. 07/462,901 filed Oct. 23, 1989 now U.S. Pat. No. 4,980,390.

Mixer compounding of filled thermoplastic resins is, in general, a process of filling a mixing chamber with combinations of (a) solid resins in pellet or flake form, (b) solid fillers in pellet, powder, or flake form, and (c) low percentage level additives, also generally in powder or flake form then operating the mixing equipment in a technically sound manner to complete a planned production time cycle or a planned production rate.

Compounding of the above components into a useful product mix is effected by first, developing high, intensive shear frictional heat energy as the dry, feedstock ingredients abrade, grind, and impinge upon each other and the metallic surfaces of the equipment during the initial early or cold phase of the mixing cycle. The high frictional heat energy, so impressed into the mix, initiates transformation of the solid resin or resins and any other organic additives into a viscous plastic mass. The on-going mixing also begins dispersion of the unmelted mineral fillers throughout the mix. Further mixing continues to develop additional frictional heat, reducing the mass viscosity even more, and increasing both the dispersion and distribution of the compounded ingredients. Eventually, a hot, homogeneous plastic mass is produced, available for and capable of further processing, thus completing the mixing phase of the compounding process.

The above described general mixing process has several major deficiencies relative to (a) optimum production efficiency, (b) optimum product quality and strength, and (c) optimum cost effectiveness.

SUMMARY OF THE INVENTION

The object of this invention is the utilization of externally preheated feedstock materials, raised to sufficiently high temperatures, and added in proper sequence, which, while within the respective safety and handling limits of said materials, provide the significant thermal energy inputs required to effect a near immediate development of plasticity and quick reduction in mass viscosity. It is this input of high thermal energy into the mixing process at its very onset which precludes the necessity for very high intensive shear frictional heat energy to develop the plasticity and which provides most significant reductions in batch production time cycles, increases in continuous mixing production rates, improvements in product quality and strength, reductions in product manufacturing costs, and reduction in equipment obsolescence and wear.

Additionally, the thermal energy costs of this externally preheated materials system are not only washed out but even reduced by reduction in both the processing electrical energy requirements and in peak electrical energy demands.

DETAILED DESCRIPTION OF THE INVENTION

The mixing time cycle for completion of typical batch sizes of commercial mineral-filled/engineering resin products is fairly long — from 5 to 10 minutes and even longer in some cases.

The typical mixing time cycle referenced above is still subject, however, to variability created by both temperature and moisture variances in the major feedstock ingredients; specifically, the resins and fillers. For example, during the winter months with feedstocks at colder temperatures and with included condensed and absorbed surface moisture, additional high intensive shear mixing over and above the usual time frame is required to both boil off the attendant additional moisture and to raise the colder feedstock material to the proper processing temperatures. For example, during the winter, "cold" mineral fillers, such as talc, calcium carbonate, mica, etc., at perhaps 20–30 Fahrenheit degrees below the usual standard year round temperature conditions, require additional mixing time, approximately 15-20% longer. It must be mentioned that this additional cycle time is critical since any remaining moisture in the compounded batch increases the barrier surface area between the non-polar resins, any added polar resins, and the generally polar mineral fillers, decreasing the desired optimum mechanical bond strength and therefore the physical and thermal properties. Some of the largest commercial applications of compounded mineral filled thermoplastic resins are in the automotive, electronic, other industrial, and household appliance fields. It is well known that the physical and thermal properties of said filled thermoplastic resins are, to a great degree, a function of the physical properties of the incorporated mineral fillers. One of the key mineral filler properties related to its capability for resin reinforcement and for development of high product strength is its "aspect ratio", defined as the ratio of a particle diameter to its thickness. This property represents not only its condition of "platyness", or its capability to flatten and assemble itself against the next particle, but even more, its capability of developing high rigidity in the fabricated product. It can be seen that a mass of flat, molded mineral "plates" interspersed with resin layers will have greater rigidity if aspect ratios of the mineral "plates" are high. This is usually evidenced by much higher flexural moduli, tensile yield strengths, and heat deflection temperatures than those molded products having fillers which are either non-platy (acicular or spherical) or whose aspect ratios are lower than the above-described high aspect ratio product.

The basic problem with filler particle aspect ratios, however, is that said aspect ratios are constantly being decreased by any and all process treatments which can apply sufficient pressures to produce filler particle breakage. Since practically all mixing equipment creates particle damage almost entirely in its diameter and only negligibly in its thickness, the aspect ratio continues to decrease as processing proceeds.

This entire litany of extents of filler aspect ratio degradation indicates that one key to filled resin product strength is to minimize particle damage, however and whenever possible, and to maintain the filler aspect ratio at its potential maximum.

Since product quality and strength of the final product delivered to the customer are, among others, functions of the accumulated process damage to the filler aspect ratio, it is incumbent on the compounder to utilize the proper and necessary feedstock materials both resins and fillers, of sufficiently high enough quality (which automatically means high enough cost) which, after all compounding and final fabrications are completed, provide a product meeting the customer's requirements.

During initial mix compounding operations, feedstock materials are, for all practical purposes, dry solids. High shear frictional pressures are exerted immediately on these solids, with dry materials grinding not only on each other but also against all of the metallic equipment contact surfaces. At this initial period prior to plasticity and before the lubricating value of the viscous resin can be brought to bear fully on the metallic equipment surfaces, not only is filler damage experienced but also abrasion and wear on said surfaces are the greatest. This is a leading factor in equipment wear, especially rapid in cases where high MOH hardness number materials, such as titanium dioxide, chopped fiber glass, and some ceramic pigments are employed as fillers.

The crux of this invention (as noted hereinabove) is applicable to all of the present, generally recognized compounding technologies and equipment-examples of which, but not limited to these, are high shear intensive batch mixing, high intensity continuous mixing, single screw extrusion, multi-screw extrusion, multi-rotor extrusion, etc.

For the purpose of explanation and illustration of the invention to those skilled in the art, however, high shear intensive mixer operation is utilized.

The pre-heated materials system utilizing a high shear intensive mixer as the major equipment component produces the following novel and most practical improvements in the state of the art:

When externally pre-heated engineering resins and fillers, both generally polar, are heated to about 400°-500° F. not only is some plasticity of the engineering resin achieved almost immediately, but the moisture which may be absorbed or adsorbed on the engineering resin and filler is boiled off completely. Additionally, when a second, usually lower temperature, non-polar resin is added sufficient residual heat remains in the system and is available to reduce its viscosity radically. Thus the need for the high thermal energy development by frictional heat build-up is reduced radically, and the additional mixing time utilized to produce the required dispersion and distribution of the ingredients to achieve homogeneity but, all in a much shorter time. Batch cycle time is reduced from a typical standard time cycle of 5-10 minutes or more and as high as 20 percent longer under referenced conditions, to a time cycle 500-1000 percent shorter than the typical standard time cycles under identical conditions.

To eliminate high shear intensive mixing time cycle variability created by variances in feedstock temperature and moisture levels, the pre-heating of the materials to a set, standard temperature not only guarantees replication of the mixing quality but also shifts the mixing time cycle to the lower end of the working range. Additionally, certainty of removal of the absorbed moisture assures a superior resin-filler intimacy of contact because of the minimized moisture barrier surface, thus assuring superior product strength.

It has been emphasized in the standard operation that reduced aspect ratios are deleterious to filler resin composite strength. In this system, the nearly immediate plasticity of the compounding batch not only minimizes the need for the high frictional shear pressures which heavily damage the fillers but provides the needed protection to the filler by very quickly enabling the filler particles to become resin-enveloped, thus providing the lubrication to hold damage to a minimum. Additionally, as previously mentioned, the reduced mixing cycle time means that the exposure time to potential filler mixing damage, under any conditions, is substantially reduced.

The following should be noted with respect to production costs. In the standard operation, feedstock quality must be of such a high order that after all compounding and final fabrication processing work is completed, the product meets customer requirements. In the case of my new process, both the reduced feedstock material damage and reduced total production cycle times enable utilizing the polar engineering resins, non-polar lower-temperature resins, and filler feedstocks of lower quality and cost, which, under the referenced reduced stresses and time will still match customer requirements. Alternatively, use of identical quality feedstocks as in the standard operation, produce products of superior quality and strength.

With respect to equipment obsolescence and wear elimination of the initial, high intensity shear pressures from the system eliminates that portion of the mixing cycle where the greatest wear potential on the equipment is produced.

Additionally, use of very fine filler particles may provide specially desired physical properties to certain resin-filler composites. Said fillers, which are very fluffy, are extremely difficult to process since they resist the mixing equipment's capability of compounding the fluffy filler into the resin.

In my invention, the near-immediate tacky resin during the initial compounding phase causes these fine filler particles to adhere to said resin for a sufficient length of time to enable the mixing blades to "take hold" of the batch material and effectively proceed with and control the compounding process to completion.

To further illustrate the process of the invention, two typical examples are:

1. A solid polyamide resin (designated the "high temperature" resin) ranging from about 20–50 parts by weight, is combined with a ceramic filler (examples; chopped fiberglass, mica, etc.) in the ranges of 20–40 parts by weight. Said solid mix is preheated to about 500° F. not only to completely dry the composite but also to develop the required and advantageous plasticity. Said "500° F." composite (designated composite A) is then combined at ambient temperature with a composite of a "lower-temperature-capable" resin (examples; polypropylene, polyethylene, etc.) ranging from 50–20 parts by weight (reverse of the weight range of said polyamide resin) and a small amount of a compatibilizer (example; maleic anhydride) in the range from about 0.5–1.5% of the total weight, (designated composite B). The two combined composites, A and B, are then subjected to high intensity shear mixing to achieve quick homogeneity, usually in 1–1½ minutes. The combination of (a) the "high temperature" resin-filler Composite A, raised to a temperature at or near its plasticity with (b) the "ambient temperature", less-temperature-capable, resin-compatibilizer Composite B results in a thermodynamic, near-median status whereby the system is still quite hot but not hot enough to develop sufficient degradation of the lower-temperature-capable resin. The two separate, but now combined composites, on being subjected to high intensity shear mixing achieve homogeneity quickly.

2. A solid polyphethylene ether resin (designated the "high temperature" resin) ranging from about 20–50 parts by weight, is combined with a ceramic filler (examples; chopped fiberglass, mica, etc.) in the ranges of 20–40 parts by weight. Said solid mix is preheated to about 500° F. not only to completely dry the composite but also to develop the required and advantageous plasticity. Said "500° F." composite (designated composite A) is then combined at ambient temperature with a composite of a "lower-temperature-capable" resin (examples; polypropylene, polyethylene, etc.) ranging from 50-20 parts by weight (reverse of the weight range of said polyphenylene ether resin) and a small amount of a compatibilizer (example; ester-group added polyarylene ether) in the range from about 0.5-1.5% of the total weight, (designated composite B). The two combined composites, A and B, are then subjected to high intensity shear mixing to achieve quick homogeneity, usually in 1-1½ minutes. The combination of (a) the "high temperature" resin-filler Composite A, raised to a temperature at or near its plasticity with (b) the "ambient temperature", less-temperature-capable, resin-compatibilizer Composite B results in a thermodynamic, near-median status whereby the system is still quite hot but not hot enough to develop sufficient degradation of the lower-temperature-capable resin. The two separate, but now combined composites, on being subjected to high intensity shear mixing achieve homogeneity quickly.

While I have illustrated and described several embodiments of my invention, it will be understood that these are by way of illustration only and that various changes and modifications may be contemplated in my invention and within the scope of the following claims:

I claim:

1. The method of compounding a high strength, cost-effective, composite of high temperature, water sensitive, polar, polyamide-imide resin mixed with a talc filler, comprising raising said mixture to a temperature of about 500° F. to develop plasticity in said resin, thereafter adding a lower temperature softening, water repellant, polypropylene resin and maleic anhydride and mixing all components in a mixing chamber sufficiently to obtain complete dispersion and homogeneity of the composite.

2. The method recited in claim 1 wherein said mixing in a mixing chamber is of a duration of 1 to 1½ minutes.

* * * * *